United States Patent [19]

Itoh et al.

[11] 4,144,074

[45] Mar. 13, 1979

[54] INORGANIC COATING COMPOSITION

[75] Inventors: Hitoshi Itoh; Iwao Momiyama, both of Hiratsuka, Japan

[73] Assignee: Kansai Paint Co., Ltd., Tokyo, Japan

[21] Appl. No.: 852,844

[22] Filed: Nov. 18, 1977

[30] Foreign Application Priority Data

Nov. 30, 1976 [JP] Japan .................................. 51-143750
Dec. 9, 1976 [JP] Japan .................................. 51-147992
Dec. 9, 1976 [JP] Japan .................................. 51-147993

[51] Int. Cl.² .............................................. C23C 3/00
[52] U.S. Cl. ................................. 106/1.17; 106/1.28; 106/14.17; 106/14.21; 106/15.05; 106/287.34; 252/8.1
[58] Field of Search .................. 106/1.17, 14, 287 S, 106/15 FP, 1.28, 14.21, 287.34, 14.17; 252/8.1

[56] References Cited

U.S. PATENT DOCUMENTS 3,320,082   5/1967   McMahon et al. .................... 106/14

*Primary Examiner*—Lorenzo B. Hayes
*Attorney, Agent, or Firm*—Ostrolenk, Faber, Gerb & Soffen

[57] ABSTRACT

An inorganic coating composition which is incombustible, water resistant and durable comprises an aqueous dispersion of colloidal silica (A), laminar aluminum oxide and/or a luminum hydroxide (B), water-soluble amino-alcohol (C), and one or more members selected from the group consisting of metallic zinc, zinc compounds and oxides and hydroxides of alkaline earth metals (D). The molar ratios of said component (C) to component (A) and said component (D) to component (A) are in the range of 0.01/1.0 to 1.0/1.0 and the weight ratio of said colloidal silica to colloidal silica plus water in said coating composition is not less than 0.1.

11 Claims, No Drawings

INORGANIC COATING COMPOSITION

BACKGROUND OF THE INVENTION (1) Field of the Invention

This invention relates to an inorganic film forming composition. More particularly, the invention relates to a coating composition which forms an incombustible coating film.

(2) Description of the Prior Art

As the coating materials for indoor and outdoor uses, organic coating materials such as aqueous dispersions of vinyl polymers containing almost no organic solvent have been employed for various purposes. However, since they mainly consists of organic materials, they are easily burnt by fire and produce smoke and noxious gases. In order to eliminate the substantial defects of organic coating materials, there has been proposed a method to use inorganic materials as the binders for coating materials. For example, alkali silicate is used as a binder and by subjecting coated films to heat treatment at high temperatures, a coating film having several good properties that are the characteristics of organic compound such as adherence, bonding strength, incombustibility and high hardness can be formed. When the coating film containing alkali silicate is formed by drying at an ordinary temperature, however, the water resistance is not substantially good, so that the coating film is liable to be softened at a high humidity atmosphere or in water, accompanied by the deterioration of a coating film. That is, the alkali silicate contains many alkali metal ions in it and internal siloxane bonds are cut by alkali metal ions, so that, when the coating film formed by drying a coating material containing the alkali silicate as a binder at an ordinary temperature is immersed in water or brought into contact with moisture, the alkali silicate dissolves again and the film becomes soft.

As a material to obviate such defects in the alkali silicate to some extent, though not completely, the colloidal silica aqueous dispersion is known. Within the colloidal silica, siloxane bonds are completely formed and silica particles themselves are completely insoluble in water. When it is dried at a lower temperature, however, the bonds of silica particles-silica particles do not coagulate in the form of the strong chemical bonds of siloxane bonds (→Si—O—Si←) but coagulate in the form of relatively weak hydrogen bonds such as

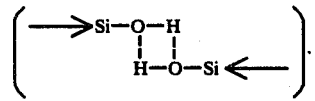

Accordingly, while the aggregate of colloidal silica once formed by drying is immersed into water for a long time, it disperses as colloidal silica particles in water and the dissociation of the aggregate is caused to occur to some extent. Further, when colloidal silica is solely used for coating, a desirable coating film cannot be formed, since the shrinkage of a coating film is very large and many cracks are caused in the obtained coating film. For this reason, solid contents in the form of powder are added to colloidal silica so as to form good coating films by relieving wet coating films of volumetric shrinkage in drying. For example, as disclosed in U.S. Pat. No. 3,320,082 (W. M. McMahon et al.), zinc rich paint is prepared by adding large amount of metallic zinc powder to colloidal silica and thus prepared coating material is used as an anticorrosive paint for iron and other metals.

Several extenders such as baryte, whiting chalk, silica white, China clay, talc, etc. are generally used as the agents for mitigating volumetric shrinkage of colloidal silica in drying. If a coating film is formed by using such an extender and colloidal silica as a binder, the extender is sufficiently serviceable for the relieving of volumetric shrinkage in drying and a coating film which seems to be desirable at first sight can be formed. It must be noted, however, that the hardness of thus obtained coating film is insufficient, and in addition, the coating films is softened in water and in a high humidity atmosphere as the dissociation of coagulated colloidal silica occurs.

BRIEF SUMMARY OF THE INVENTION

It is, therefore, the primary object of the present invention to provide an improved inorganic coating composition which is entirely free from the above-mentioned disadvantages in the conventional art. Another object of the present invention is to provide an inorganic coating composition which is incombustible and produces neither smoke nor noxious gases in fire.

A further object of the present invention is to provide an inorganic coating composition which is water resistant and is not softened in a high humidity condition or in water.

Still a further object of the present invention is to provide an inorganic coating composition which has various properties of good and controllable drying property, high hardness, and so forth.

With the above objects, the present inventors have carried out extensive studies on the compounds which react with the colloidal silica in the drying process and have the effect of mitigating volumetric shrinkage of the colloidal silica. As a result, it has been found out the aluminum oxide and aluminum hydroxide are effective. That is, in an aqueous solution, the surfaces of aluminum oxide particles and aluminum hydroxide particles are covered by >Al—OH groups. The surfaces of the colloidal silica particles in an aqueous solution are covered by silanol groups (→Si—OH). Accordingly, these functional groups react with each other in the process of drying of water content, thereby forming hydrogen bonds

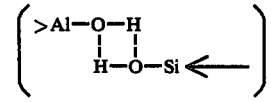

or >Al—O—Si← bonds by the dehydration condensation.

Further, in the above reaction, it is considered that the dehydration condensation proceeds to change the hydrogen bonds to (>Al—O—Si←) with the releasing of the water in a coating film.

The inventors of this application have already proposed an invention on a film forming composition which comprises colloidal silica and alumina compound as main components (U.S. Patent Appln. Ser. No. 719,728). With this coating composition, the coating films having satisfactory properties for ordinary purposes can be obtained, however, such coating films are softened in a quite severe condition such as the immersion in the boiling water. Further, the drying property of the coating film is not good in a high humidity condition of more than 90%, so that the formation of dried coating film takes many hours and the work efficiency is much reduced. Accordingly, the inventors have also studied in order to shorten the drying time even in a high humidity condition and to improve the hardness, high-build property and boiling water resistance of obtained coating films.

When the surface charge of the colloidal silica is thrown out of balance, the colloidal silica becomes a gel with the momentary coagulation reaction. As the compounds to cause this gelation, there are many compounds including electrolytic compounds. As a result of the investigation with regard to all of these coagulating agents, it has been found out that the most preferable compounds in point of the hardness and water resistance of the obtained aggregate are oxides and hydroxides of alkaline earth metals, and zinc ion. Nevertheless, when any quantity, large or small, of oxides or hydroxides of alkaline earth metals or compounds easily liberating zinc ions is simply added to the aqueous dispersion of the colloidal silica, the coagulation occurs within several seconds to several tens of minutes to form a gel, so that it cannot be used as a coating material at all. Hence, the inventors of the present application have carried out the investigation on the compounds which control the rate of coagulation between colloidal silica and oxides or hydroxides of alkaline earth metals or zinc ions. As a result, it has been found out that the rate of coagulation can be regulated by the combined use of water-soluble amino-alcohols. In other words, the time required for coagulation can be freely controlled by regulating the compounding ratio of the amino-alcohols and the oxides or hydroxides of alkaline earth metals or zinc compounds, and in addition, the curing property is simultaneously improved.

Although a reason why the amino-alcohols control the rate of coagulation between the colloidal silica and the oxides or hydroxides of alkaline earth metals or zinc ions is not fully known, it is presumed that, when amino-alcohol is added to the aqueous dispersion of the colloidal silica, the amino-alcohol is adsorbed selectively to the silanol groups on the surfaces of colloidal silica particles, thereby protecting the active sites which react with the oxides or hydroxides of alkaline earth metals or zinc ions. Accordingly, the replacement of the amino-alcohol adsorbed to the silanol groups (active sites) of the colloidal silica in solution with the alkaline earth metal ions or zinc ions becomes the rate-determining step, and therefore, the time necessary for the coagulation is elongated. It will be thus understood that the rate of reaction between the colloidal silica and alkaline earth metal ions or zinc ions can be regulated by the combined use of water soluble amino-alcohols.

With the above-described results of investigation, the inorganic coating composition of the present invention having excellent hardness and water resistance has been accomplished.

In accordance with the present invention, the coating composition comprises the components of: an aqueous dispersion of colloidal silica (A), laminar aluminum oxide and/or aluminum hydroxide (B), water-soluble amino-alcohol (C), and one or more members selected from the group consisting of metallic zinc, zinc compounds, alkaline earth metal oxides and alkaline earth metal hydroxides (D). The shape of the particles of the above component (B) is defined by the formulae:

$$50 \geq w/h \geq 2 \text{ and } 5 \geq l/w \geq 1,$$

in which the symbol l represents the length; w, the width; and h, the thickness. The quantity of the above component (B) to be used may be determined within such a range that the nonvolatile components in the composition becomes 40–90% by weight.

Further, the molar ratio of the component (C) to the component (A) (amino-alcohol/$SiO_2$) is in the range of 0.01/1.0 to 1.0/1.0 and the molar ratio of the component (D) to the component (A) (RO/$SiO_2$: where R represents an alkaline earth metal ion, or Zn/$SiO_2$) is in the range of 0.01/1.0 to 1.0/1.0. Furthermore, the quantity of the colloidal silica in the above component (A) may be 0.1 or more in the composition as calculated by the ratio of $SiO_2/(SiO_2 + H_2O)$ by weight.

DETAILED DESCRIPTION OF THE INVENTION

The inorganic coating composition of the present invention is characterized in that it has a good curing property as compared with those of the conventional coating compositions described above and the water resistance and the adhesion of the cured coating film is much improved. Further, since the most components of the coating composition in the present invention are inorganic compounds, the cured coating film is not burnt at all even if it is exposed to gas flames.

The aqueous dispersion of the colloidal silica used in the present invention contains about 10 to 50% by weight of $SiO_2$ component which is stabilized with any of a small quantity of alkali metal ion or ammonium ion. Further, the colloidal silica aqueous dispersion in which the colloidal silica particles are modified with alumina or an organic silicon compound, can also be used in the present invention. The silica particles in the above colloidal silica aqueous dispersions are to be very small, and the preferable particle diameter may be within the range of 1 to 100 m$\mu$.

The quantity of amino-alcohols to be used is 0.01/1.0 to 1.0/1.0 as represented by the molar ratio of amino-alcohols to $SiO_2$ in colloidal silica aqueous dispersion (amino-alcohols/$SiO_2$). When the quantity of amino-alcohol exceeds the above-described range, the coating composition becomes stimulative to the skin, eyes, noses and the like of users, which is not desirable in handling. Further, efflorescences are liable to occur on the coated surfaces which makes the external appearance worse. On the contrary, when the quantity of amino-alcohol is smaller than the above-described range, the effect to retard the rapid coagulation between the colloidal silica and the oxides or hydroxides of alkaline earth metals or zinc compounds cannot be expected. That is, the pot life of the obtained coating composition becomes so short that the composition cannot be practically used as a coating material. The preferable range of the amino-alcohols is within the range of 0.05/1.0 to 0.5/1.0 by molar ratio of (amino-alcohols/$SiO_2$).

Exemplified as the water-soluble amino-alcohols are monoethanolamine, diethanolamine, triethanolamine, isopropanolamine, aminoethyl ethanolamine, and other amino-alcohols having both amino groups and hydroxyl groups in its molecule such as 2-amino propanol, diethyl ethanolamine, aminomethyl ethanolamine, dimethyl ethanolamine, 2-amino buthanol, 2-amino-2- ethyl-1,3-propane diol, 2-amino-2-methyl-1,3-propane diol and 2-amino-2-methyl-1-propanol.

As described above, the oxides or hydroxides of alkaline earth metals are used for improving the curing property and the water resistance of the coating films. The quantity of these alkaline earth metal oxides and hydroxides to be used in the coating composition is in the range of 0.01/1.0 to 1.0/1.0 when it is represented by the molar ratio to $SiO_2$ in colloidal silica aqueous dispersion ($RO/SiO_2$, in which the symbol R represents alkaline earth metal ions). When the quantity of alkaline earth metal oxides or hydroxides exceeds the above range, the pot life of the coating composition becomes very short even if amino-alcohols are jointly used so as to retard the rapid coagulation between the colloidal silica and the oxides or hydroxides of alkaline earth metals. Therefore, the coating composition will become unserviceable. On the contrary, when the quantity of alkaline earth metal oxides or hydroxides is smaller than the above defined range, the boiling water resistance of coating film becomes poor. Exemplified as the oxides and hydroxides of alkaline earth metals are beryllium oxide, magnesium oxide, magnesium aluminum oxide, magnesium iron oxide, calcium oxide, strontium oxide, iron strontium oxide, barium oxide, aluminum barium oxide, beryllium hydroxide, magnesium hydroxide, calcium hydroxide, strontium hydroxide, and barium hydroxide. These alkaline earth metal oxides and hydroxides are, of course, used together.

With the same purpose as the alkaline earth metals, metallic zinc and/or zinc compounds can also be used in the present invention. The molar ratio of them relative to $SiO_2$ in the colloidal silica aqueous dispersion ($Zn/SiO_2$, in which Zn represents the moles of metallic zinc itself and/or zinc compounds) is in the range of 0.01/1.0 to 1.0/1.0. If the quantity of metallic zinc and/or zinc compounds exceeds the above range, the state of a coating film surface becomes worse with the deposition of metallic zinc on the film surface when metallic zinc is used, and when zinc compounds are used, the state of the film surface also becomes worse, since chalking becomes liable to occur. On the other hand, if the quantity of them is smaller than the above range, the boiling water resistance of a coating film becomes worse. Exemplified as the zinc compounds are zinc oxide, zinc hydroxide, zinc chloride, zinc borate, zinc phosphate, zinc phosphite, zinc pyrophosphate, zinc silicate, zinc silico-fluoride, zinc fluoride, zinc carbonate, zinc alkali metal salts, zinc alkaline earth metal salts and zinc ammonium salt.

The reaction between the colloidal silica and the foregoing aluminum oxide and/or aluminum hydroxide is of deep significance in the curing of the coating composition of the present invention. Further, in order to use the coating composition advantageously, the shapes of aluminum oxide and aluminum hydroxide are also quite important for the film forming.

That is, the shrinkage of the coating film caused in the above reaction can be relieved to some extent by using the granular aluminum oxide or aluminum hydroxide. However, in order to obtain the practical effect, they must be in the form of laminae or flakes.

In the coating composition of the present invention, the desirable curing reaction of coating film and the relieving of shrinkage stress in the curing are simultaneously attained, and thus, the coating film of excellent durability can be formed on the surface of a substrate.

As the laminar aluminum oxides, there are $\alpha$-form, $\beta$-form, $\rho$-form, x-form, $\gamma$-form, $\eta$-form, $\delta$-form, and $\kappa$-form aluminum oxides. As the laminar aluminum hydroxides to be used, there are gibbsite, boehmite, diaspore, and corundum type ones. If the shape of particles is laminar, the shrinkage stress in the coating film that occurs in drying (curing reaction) can be largely relieved, and further, the effect to prevent the cracking of the coating film is quite large as compared with granular particles, since the laminar particles lie one over another in the coating film. Therefore, the high-build coating films can be obtained. Furthermore, the surface areas of laminar particles are large, so that the reaction between colloidal silica and aluminum oxide and/or aluminum hydroxide can proceed sufficiently. In other words, the colloidal silica particles are spherical, and if the aluminum oxide and aluminum hydroxide are also spherical, the aggregate of sphere-sphere combination is formed in which the points of joining is very small in number. While, in the sphere-lamina combination, the laminar aluminum oxide or aluminum hydroxide units are joined by the colloidal silica, so that the number of joining points becomes very large as compared with the sphere-sphere combination, and in addition, the percentage of voids of the coating film becomes small.

According to the investigation by the present inventors, if the ratio of width/thickness of alumina oxide and/or aluminum hydroxide is less than 2, and the ratio of length (l) to width (w) thereof departs from the range of $5 \geq l/w \geq 1$, the percentage of voids of the coating film becomes large and the effect to relieve the shrinkage stress in curing becomes worse, which reduces the forming of the high-build coating film. On the other hand, if the ratio of width/thickness becomes more than 50, the film surface becomes nappy and the appearance of the film surface is poor.

The quantity of aluminum oxide and/or aluminum hydroxide to be used may be such that the non-volatile matter in the coating composition is in the range of 40 to 90% by weight. When the quantity of aluminum oxide and/or aluminum hydroxide is larger than the above range, the viscosity of coating composition becomes very high impairing the coating workability of the composition. While, if the quantity of aluminum oxide and/or aluminum hydroxide is smaller than the above range, the physical shrinkage in drying of the coating film becomes large, so that cracking is liable to occur and a desirable coating film cannot be obtained. Further, the above-described range of non-volatile matter is preferably in the range of 55 to 75% by weight. The particle size of aluminum oxide and/or aluminum hydroxide may be in the range of 1 to 100$\mu$, preferably 3 to 50$\mu$.

Furthermore, the coating composition of the present invention can be combined with the various pigments such as a titanium dioxide in order to color the composition. Still further, in order to improve the characteristic properties of the coating composition, several inert fillers or extenders can be used, which extenders are exemplified by clay, mica, talc and carbonates of alkaline earth metals that are generally used in the ordinary coating compositions. In addition to the above additives, other additives, for example, flowability controlling agents such as bentonite, defoaming agents and surface active agents may also be added to the coating composition of the present invention.

The quantity of the colloidal silica ($SiO_2$) to the sum of the colloidal silica and water in the coating composition of the present invention, i.e., $SiO_2/(SiO_2 + H_2O)$, must be 0.1 or more. When the above ratio is smaller than 0.1, chalking is caused to occur as the binder component is lacking and the curing property of the coating film becomes poor.

The coating composition of the present invention can be prepared in like manner as the conventional processes. If possible, the water-soluble amino-alcohol is firstly dissolved in the colloidal silica aqueous dispersion and then, powder components are added to the mixture, which is dispersed by using a pebble mill or a high speed mixer. In another preferable method, the aluminum oxide or aluminum hydroxide is dispersed in the colloidal silica aqueous dispersion, and separately, the water-soluble amino-alcohol, pigment, surface active agent and other components are dispersed in water, and the above two dispersions are mixed together before the application.

The coating composition of the present invention has a good adhesive property to the ceramic substrates, glass substrates, concrete substrates, mortar substrates, calcium silicate plates, slates, steel plates and zinc rich paint coating surfaces. In the case that the substrate absorbs the coating material, the absorption can be avoided by pre-heating the substrate at 40° C. or above, before the coating material is applied.

The coating composition of the present invention can be applied to the surfaces of various materials through the conventionally known methods such as air spraying, airless spraying, roller coating, brushing, curtain-flow coating and so forth.

The drying of coated film is generally carried out at ordinary temperature, however, if the drying time must be saved, it is also possible to dry by heating.

In order to describe the present invention in more detail, several examples will be given in the following. It is to be noted, however, that the present invention is by no means restricted to these examples.

EXAMPLES 1 TO 5 AND COMPARATIVE EXAMPLES 1 TO 3 AND 5

Coating compositions were prepared with the components shown in the following Table 1. These coating compositions were applied to the slate substrates with using spray guns to form coating films of 70μ in dried thickness.

COMPARATIVE EXAMPLE 4

A coating composition was prepared by using the 40% sodium silicate ($Na_2O.3SiO_2$) aqueous solution in place of the colloidal silica aqueous dispersion in Example 1. The other components used were the same as those in Example 1 that are shown in Table 1. The thus obtained coating composition was applied to the slate substrates in like manner as Example 1 and they were dried likewise to obtain the test samples.

The test samples prepared in Examples 1 to 5 and Comparative Examples 1, 2, 4 and 5 were subjected to the several tests, the results of which are shown in the following Table 2.

Table 1

| Components | Example 1 | Example 2 | Example 3 | Example 4 | Example 5 | Comparative Example 1 | Comparative Example 2 | Comparative Example 3 *3 | Comparative Example 5 |
|---|---|---|---|---|---|---|---|---|---|
| Colloidal silica aq. dispersion (A) *1 $SiO_2$ *2 | 1.0 | 1.0 | 1.0 | 1.0 | 1.0 | 1.0 | 1.0 | 1.0 | 1.0 |
| Water-soluble amino-alcohols (B) *5 | | | | | | | | | |
| Monoethanolamine | 0.1 | | | 0.05 | 0.3 | 0.1 | | | 0.1 |
| Diethanolamine | | 0.2 | | 0.05 | | | | | |
| Isopropanolamine | | | 0.05 | 0.05 | | | | | |
| Aluminum oxide or hydroxide (C) Compound | $Al_2O_3$ | $Al_2O_3$ + $Al(OH)_3$ | $Al(OH)_3$ | $Al_2O_3$ | $Al(OH)_3$ | $Al_2O_3$ | $Al_2O_3$ + $Al(OH)_3$ | $Al(OH)_3$ | $Al_2O_3$ |
| Quantity *6 | 1.4 | 1.3 | 2.0 | 1.0 | 1.8 | 1.4 | 1.3 | 2.0 | 1.4 |
| Particle shape *4 | 50≧w/h≧2, 4≧1/w≧1.5 | | | | | 50≧w/h≧2, 4≧1/w≧1.5 | | | w/h≦1.5 1/w≦1 |
| Oxide or hydroxide of alkaline earth metals (D) Compound | MgO | | Ca(OH)$_2$ | Mg(OH)$_2$ | Ba(OH)$_2$ | | | CaO | MgO |
| Quantity *5 | 0.3 | | 0.2 | 0.5 | 0.05 | | | 0.01 | 0.3 |
| Metallic zinc or zinc oxide (D) Compound | | Zn | Zn(OH)$_2$ | Zn$_3$(PO$_4$)$_2$ | ZnCl$_2$ | | | | |
| Quantity *5 | | 0.1 | 0.2 | 0.1 | 0.05 | | | | |
| Pigments | Titanium white | Iron oxide red | Cobalt blue | Iron black | Zinc yellow | Titanium white | Iron oxide red | Cobalt blue | Titanium white |
| Quantity *7 | 0.14 | 0.13 | 0.2 | 0.1 | 0.18 | 0.14 | 0.13 | 0.2 | 0.14 |
| Water (H$_2$O) *6 | 0.1 | 0.5 | 0.75 | — | 1.3 | 0.1 | 0.5 | 0.75 | 0.1 |

Notes for Table 1:-
*1 50 wt. % (as dry basis) aqueous dispersion of colloidal silica was used.
*2 Moles of colloidal silica in the component (A).
*3 Within 1 minute from the preparation of coating composition, gelation was caused to occur so that the obtained composition could not be used as a coating compositic
*4 In the representation w/h, w indicates the width of particles and h, the thickness of particles. In 1/w, 1 indicates the length of particles and w, width.
*5 Moles per one mole of SiO$_2$ in the component (A).
*6 Parts by weight per one part by weight of SiO$_2$ in the component (A).
*7 Parts by weight per one part by weight of the component (C).

Table 1

| Test Conditions | | | Example | | | | | Comparative Example | | | |
|---|---|---|---|---|---|---|---|---|---|---|---|
| Items | Drying time | Test hrs.*1 | 1 | 2 | 3 | 4 | 5 | 1 | 2 | 4 | 5 |
| Curing property *2 | 1 day | — | 5H | 5H | 4H | 3H | 5H | 3H | H | 3H | 5H |
| | 30 days | — | 9H or above | 9H or above | 9H or above | 9H or above | 9H or above | 4H | H | 6B | 9H or above |

Table 1-continued

| Items | Test Conditions Drying time | Test hrs.*1 | Example 1 | 2 | 3 | 4 | 5 | Comparative Example 1 | 2 | 4 | 5 |
|---|---|---|---|---|---|---|---|---|---|---|---|
| Water resistance (20° C)*3 | 24 hrs | 240 hrs | Good | Good | Good | Good | Good | Sl.Soft | Soft. | Soft. | Good |
| Boiling water resistance (100° C) | 24 hrs | 1 hr | Good | Good | Good | Good | Good | Soft. | Soft. | Soft. | Good |
| Combustion test*4 | 24 hrs | — | Incomb. | Incomb. | Incomb. | Incomb. | Incomb. | Incomb. | In-comb. | In-comb. | Incomb. |
| Adhesion*5 | 24 hrs | — | 100/100 | 100/100 | 100/100 | 100/100 | 100/100 | 100/100 | 50/100 | 50/100 | 100/100 |
| Critical thickness causing cracks (μ) | 24 hrs | — | 280 μ | 250 μ | 300 μ | 220 μ | 280 μ | 250 μ | 230 μ | 280 μ | 80 μ |

Notes for Table 2:-
*1 The coating compositions shown in Table 1 were applied to the substrate plates of slate and they were dried. The thus obtained test samples were subjected to the several tests. "Test hours" in Table 2 indicates the time of immersion of the coated plates in water or boiling water.
*2 Test samples were exposed for 1 day at 20° C and 75% relative humidity, and for 30 days in outdoors. They were then subjected to the pencil hardness test. (The samples in Example 5 were dried by heating at 150° C for 10 minutes immediately after the application).
*3 "Sl.Soft." means "slightly softened" and "Soft" means "softened".
*4 By heating test samples for 3 minutes with a Bunsen burner, the state of heated coating film was examined. "Incomb." means "incombustible".
*5 On the surface of the coating film of a test sample, two sets of eleven notch lines having intervals of 1 mm, perpendicular to each other, and reaching the surface of the substrate, were formed with a knife thereby forming 100 squares of coating film. Then, a self-adhesive tape was applied to the checkerboard pattern of 100 squares with pressure and it was peeled off abruptly. The remaining squares of coating film were counted and indicated as the denominator of each fractional number.
*6 Examined by the naked eye by using a magnifying glass of 30 magnifications. With the above-described explanation and test results, the advantages and excellences of the present invention may be clearly understood.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An inorganic coating composition comprising: an aqueous dispersion of colloidal silica (A), laminar aluminum oxide and/or aluminum hydroxide (B), water-soluble amino-alcohol (C), and at least one coagulating agent selected from the group consisting of metallic zinc, zinc compounds and oxides and hydroxides of alkaline earth metals (D), the particle shape if said component (B) being defined by the formulae:

$$50 \geq w/h \geq 2 \text{ and } 5 \geq l/w \geq 1,$$

in which the symbol l indicates length of particles, w indicates width and h indicates height, and the quantity thereof to be used being such that non-volatile matter in said coating composition is in the range of 40 to 90% by weight, and further, the molar ratio of said component (C) to said component (A) (amino-alcohol/$SiO_2$) being in the range of 0.01/1.0–1.0/1.0, the molar ratio of said component (D) to said component (A) ($RO/SiO_2$ where R represents an alkaline earth metal ion, or $Zn/SiO_2$) being in the range of 0.01/1.0–1.0/1.0, and the weight ratio of the colloidal silica contained in said component (A) to water plus said colloidal silica in said composition ($SiO_2/SiO_2 + H_2O$) is not less than 0.1.

2. An inorganic coating composition as claimed in claim 1, wherein the particle size of the colloidal silica in said component (A) is in the range of 1 to 100 mμ.

3. An inorganic coating composition as claimed in claim 1, wherein said amino-alcohol is at least one member selected from the group consisting of monoethanolamine, diethanolamine, triethanolamine, isopropanolamine, aminoethyl ethanolamine.

4. An inorganic coating composition as claimed in claim 1, wherein said zinc compound in said component (D) is at least one member selected from the group consisting of zinc oxide, zinc hydroxide, zinc chloride, zinc borate, zinc phosphate, zinc phosphite, zinc pyrophosphate, zinc silicate, zinc silicofluoride, zinc fluoride, zinc carbonate, zinc alkali metal salt, zinc alkaline earth metal salt and zinc ammonium salt.

5. An inorganic coating composition as claimed in claim 1, wherein said oxide or hydroxide of alkaline earth metal in said component (D) is at least one member selected from the group consisting of beryllium oxide, magnesium oxide, magnesium aluminum oxide, magnesium iron oxide, calcium oxide, strontium oxide, iron strontium oxide, barium oxide, aluminum barium oxide, beryllium hydroxide, magnesium hydroxide, calcium hydroxide, strontium hydroxide, and barium hydroxide.

6. An inorganic coating composition as claimed in claim 1, wherein said laminar aluminum oxide is at least one member selected from the group consisting of the aluminum oxide in α-form, β-form, ρ-form, x-form, γ-form, η-form, δ-form, and κ-form.

7. An inorganic coating composition as claimed in claim 1, wherein said laminar aluminum hydroxide is at least one member selected from the group consisting of gibbsite, boehmite, diaspore, and corundum.

8. An inorganic coating composition as claimed in claim 1, further comprising at least one member of the group consisting of coloring pigment, inert extender, flowability controlling agent, defoaming agent and the surface active agent.

9. An inorganic coating composition as claimed in claim 1 wherein said ratio of component (C) to component (A) is 0.05/1.0 to 0.5/1.0, and wherein the particle size of said colloidal silica is 3–5 mμ.

10. An inorganic coating composition as claimed in claim 1 wherein said amino alcohol is monoethanolamine, diethanolamine, isopropanolamine or a mixture thereof; said ratio of component (C) to component (A) is 0.05/1.0 to 0.3/1.0; wherein said l/w is $4 \geq l/w \geq 1.5$; said component (B) is present in an amount of 1.3–2.0 parts per part of $SiO_2$; and wherein the parts of component (D) to component (A) is 0.1/1.0 to 0.6/1.0.

11. An inorganic coating composition as claimed in claim 1 wherein said component D is said zinc components or said oxides or hydroxides of alkaline earth metals.

* * * * *